United States Patent [19]

Sahora et al.

[11] Patent Number: 4,975,789
[45] Date of Patent: Dec. 4, 1990

[54] RECORDING APPARATUS FOR A DRIVABLE RECORD CARRIER

[75] Inventors: Karl Sahora, Wiener Neudorf; Hans Schranz; Werner Willmann, both of Vienna, all of Austria

[73] Assignee: U.S. Philips Corporation, New York, N.Y.

[21] Appl. No.: 336,981

[22] Filed: Apr. 12, 1989

[30] Foreign Application Priority Data

Apr. 27, 1988 [AT] Austria .................... 1078/88

[51] Int. Cl.⁵ .............................................. G11B 19/16
[52] U.S. Cl. ...................................... 360/72.1; 369/27
[58] Field of Search ............................ 360/72.1–72.3; 369/27

[56] References Cited

U.S. PATENT DOCUMENTS

3,760,124 9/1973 Graven ........................... 369/27 X

Primary Examiner—A. J. Heinz

[57] ABSTRACT

A recording apparatus for a drivable record carrier which can be moved past a scanning element of the apparatus comprises a marking device for making marks of different types on a marking carrier to identify specific passages on the record carrier. A marking element of the marking device is guided along a line and, to form the marks, it can be moved, starting from the line, by means of an actuating device in a first direction perpendicularly to said line and in a second direction opposite to said first direction. In order to obtain marks of a first type and a second type the marking element can form strokes on the marking carrier, which extend transversely of the line in the first direction or in the second direction only. Moreover, in order to obtain marks of at least one further type by means of the marking element, strokes can be formed on the marking carrier, which strokes extend transversely of the line both in the first direction and in the second direction.

2 Claims, 4 Drawing Sheets

RECORDING APPARATUS FOR A DRIVABLE RECORD CARRIER

BACKGROUND OF THE INVENTION

The invention relates to a recording apparatus for a drivable record carrier which is adapted to cooperate with at least one scanning element of the apparatus and which can be moved past the scanning element. The which apparatus comprises a marking device for selectively forming line-shaped marks of different types on a marking carrier, which marks indicate an instantaneous relative position between the record carrier and the scanning element which marking device comprises at least one marking element which can be driven in synchronism with the relative movement between the record carrier and the scanning element. The marking device is guided along a line to form line-shaped marks, and which can be moved to and fro by means of an actuating device perpendicularly from the line in a first direction perpendicular to said line and in a second direction opposite to said first direction. The actuating device moves the marking element in the first direction to make a mark of a first type and in the second direction to make a mark of a second type, the marks of the first type and the second type being formed by strokes which extend transversely of the line in one of the two directions A known apparatus of this type is commercially available as a dictation machine constructed to receive a cassette containing a record-carrier in the form of a magnetic tape. At each of its two main sides the cassette carries a strip-shaped marking carrier which contains magnetically orientable particles and which can be provided with line-shaped marks by means of a marking element which forms part of a marking device of the machine. The marking device has a thin rod-shaped permanent magnet which is actuated by an actuating device in the apparatus. When the magnetic tape is driven, the marking element in the known apparatus is moved over the marking carrier in synchronism with the tape and along a line which extends in the longitudinal direction of the marking-carrier strip, causing the marking element to form a continuous line on the marking carrier in the longitudinal direction of the strip. The known apparatus enables marks of a first type, designating the end of a dictation on the magnetic tape, to be made on the marking carrier by means of the marking element by moving this element to and fro in order to form strokes which extend exclusively in the first direction to one side and transversely of the continuous line. Marks of a second type, which designate a dictated passage on the magnetic tape for which a dictator wishes to give a special instruction, such as for example an insert or a correction to the dictation, can be made on the marking carrier by means of the marking element by another to-and-fro movement of this element to form strokes which extend exclusively in the second direction to one side and transversely of the continuous line. In this prior-art apparatus the possibilities of making marks on the marking carrier are limited because only these two types of marks can be made on the marking carrier. In practice, this imposes an undesirable limitation on the use of such an apparatus because it is found that further types of marks are required which cannot be realized by means of the prior-art apparatus.

SUMMARY OF THE INVENTION

Therefore, it is an object of the invention to meet this requirement and to construct an apparatus of the type defined in the opening paragraph in such a way that by means of the marking element of the marking device of this apparatus at least one further, i.e. at least a third, type of marks can be made on the marking carrier. According to the invention this is achieved in that for making a mark of at least one further type the actuating device moves the marking element at least one time in both directions directly after each other, at least one stroke which extends transversely of the continuous line in both directions being formed as a mark of a further type. Thus it is achieved in a very simple manner substantially without any additional provisions and by means which are available anyway, that by means of the marking element at least one further type of marks can be made on the marking carrier by at least one to-and-fro movement towards two sides of this element, which marks are formed by strokes which, relative to the line along which the marking element is moved in synchronism with the record carrier when this record carrier is driven, extend transversely both in the first direction and in the second direction opposite to said first direction. Such further marks can also be visually identified in an unambiguous manner and differ very distinctly from marks of both types known until now, which are each formed by a stroke which extends transversely of said line in only one of the two directions.

As stated above a mark of a further type can be made on the marking carrier, for example by moving the marking element to form a stroke which extends transversely of the continuous line both in the first direction and in the second direction. However, it is also found to be advantageous if for making a mark of a further type the actuating device moves the marking element in both directions at least twice in succession at a predetermined time interval, at least two adjacent strokes which extend transversely of the continuous line in both directions being formed as a mark of such a further type. Such a double-stroke mark can be distinguished very clearly from the other single-stroke marks so that the marks have the advantage that they are easy to identify. However, alternatively, such a mark may be formed by three or more of such adjacent strokes which extend transversely of the line in both directions, so that in this way numerous types of marks can be formed depending on the number of strokes.

BRIEF DESCRIPTION OF THE DRAWINGS

An embodiment of the invention will now be described in more detail, by way of non-limitative example, with reference to the accompanying drawings.

DESCRIPTION OF THE PREFERRED EMBODIMENT

Figure 1:
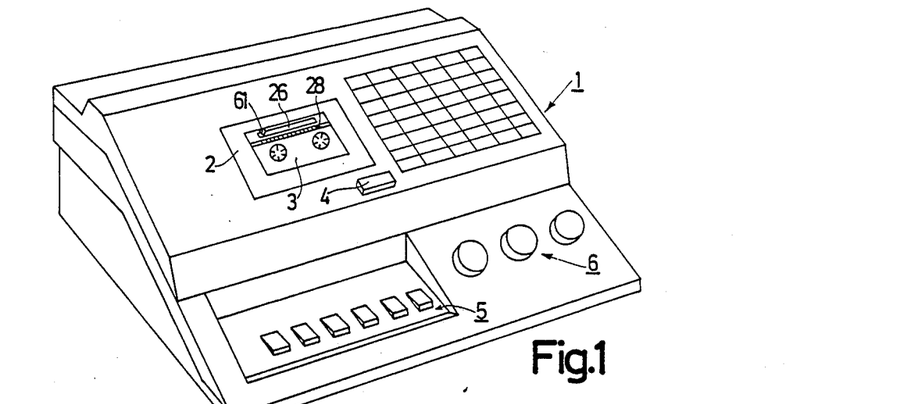
FIG. 1 is a simplified perspective view of a recording and reproducing apparatus constructed as a desk-top dictation machine adapted to receive a cassette accommodating a record carrier in the form of a magnetic tape and provided with a strip-shaped marking carrier at each of its two main sides.

FIG. 1 shows a desk-top dictation machine 1, comprising a cassette receptacle which can be closed by means of a pivotable cover 2 and which is constructed to receive a cassette 3 accommodating a magnetic tape. The cover 2 can be opened by pressing a push-button 4, which causes a latching device for the cover 2 to be released and the cover to be opened under spring force. The apparatus 1 comprises a keyboard 5 comprising six keys by means of which the modes of operation and operating functions of the apparatus 1 can be selected, for example the "normal forward", "fast forward" and "fast reverse" modes. By actuating the keys of the keyboard 5 signals can be applied to a microprocessor of the apparatus 1, in which microprocessor these signals are processed in order to supply control signals corresponding to the input signals to units of the apparatus such as the drive means, the control circuit, the amplifier circuit etc., to select and carry out the desired modes of operation in the apparatus. The apparatus 1 further comprises a set 6 of three rotary controls for adjusting operating parameters of the apparatus 1, namely the reproduction volume, the reproduction tone and the reproduction tape-speed.

Figure 2:
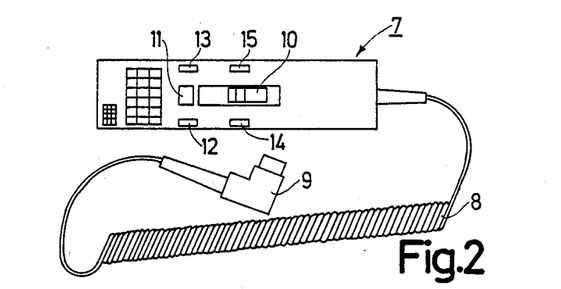
FIG. 2 is a simplified plan view of a remote-control microphone to be connected to the apparatus shown in FIG. 1, which in addition to a micro-phone-loudspeaker unit also comprises actuating keys for the remote control of the modes of operation of the apparatus and for the remote control of marking function to form four different types of marks on the marking carrier on the cassette.

FIG. 2 shows a remote-control microphone 7, which is connected to a plug 9 by a lead 8, which plug can be inserted into a socket in a side wall of the apparatus 1 which is not visible in FIG. 1, to connect the microphone 7 to the apparatus 1. The microphone 7 comprises a microphone-loudspeaker unit, not shown, for the electro-acoustic conversion of speech signals. The microphone 7 further comprises a slide button 10, which is slidable between four positions to select the "fast reverse", "stop", "normal forward" and "fast forward" modes in the apparatus 1 corresponding to these four positions. The "recording" mode of the apparatus 1 can be selected by means of a push-button 11. The microphone 7 further comprises four other push-buttons 12, 13, 14 and 15, which can be actuated to make four different types of marks on a marking carrier provided on the cassette, as will be described in detail hereinafter. The signals generated when the slide button 10 and the push-buttons 11, 12, 13, 14 and 15 are actuated are applied to the apparatus 1 via the lead 8 and the plug 9 and are processed by the microprocessor, which supplies corresponding control signals for selecting and carrying out the desired modes of operation and operating functions.

Figure 3:
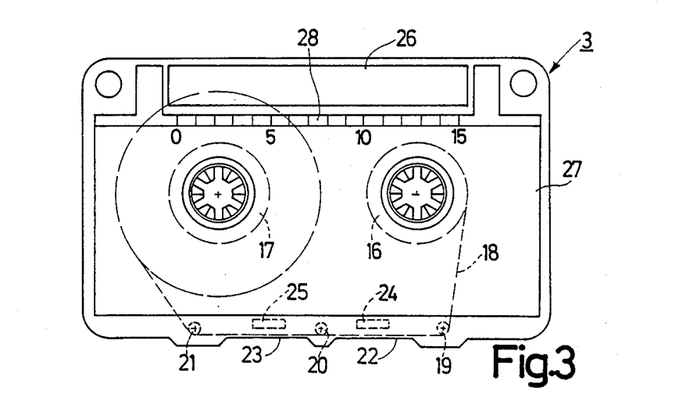
FIG. 3 shows a cassette which can be loaded into the apparatus shown in FIG. 1 in a diagrammatic plan view and to an enlarged scale in comparison with FIG. 1.

FIG. 3 shows a cassette 3 which can be loaded into the apparatus shown in FIG. 1 in two mutually inverted positions. The cassette 3 accommodates two juxtaposed rotatable reel hubs 16 and 17, onto which a magnetic tape 8 can be wound. As is illustrated in FIG. 3, the magnetic tape 18 is guided from the reel hub 16 to the tape roll on the reel hub 17 via, three tape guides 19, 20 and 21, the whole length of magnetic tape being wound on the reel hub 17. At the location of the tape guides 19, 20 and 21 the magnetic tape 18 extends along a long narrow front wall of the cassette 3 in which two openings 22 and 23 are formed through which two magnetic heads of the apparatus, namely a magnetic recording and reproducing head and a magnetic erase head can cooperate with the magnetic tape 18 to scan this tape, the magnetic tape 18 being pressed against the head faces of the two magnetic heads by means of two movable supported pressure pads 24 and 25, which are shown only diagrammatically in FIG. 3.

A strip-shaped marking carrier 26 and a label 27 are applied to each of the two main walls of the cassette 3 by means of an adhesive. The marking carrier 26 and the label 27 on each main side each correspond to one of two tracks on the magnetic tape which can be scanned by the magnetic tape which can be scanned by the magnetic heads in opposite directions. The label 27 is provided with printed information not shown, and with a printed scale 28 which extends parallel to the marking carrier 26 and which has a total length corresponding to the total length of the magnetic tape 18, the numerals near the scale indicating the number of minutes elapsing when the magnetic tape is driven in the "normal forward" mode. The present scale 28 shows that in the case of the cassette 3 fifteen minutes are needed to wind the whole magnetic tape 18 from one reel hub onto the other reel hub in the "normal forward" mode.

The marking carrier 26 is a known carrier comprising magnetically orientable particles for storing and visually displaying marks. Depending on whether the particles are oriented in one of two substantially perpendicular directions they appear as bright or dark images under the influence of the incident light. Such an orientation can be achieved selectively by means of the free end of a rod-shaped axially magnetized permanent magnet disposed perpendicularly to the marking carrier, so that under the influence of the magnetic field which extends substantially perpendicularly to the carrier plane the relevant particles are also oriented in a direction perpendicular to the carrier plane and are therefore optically distinct from the surrounding particles which are pre-oriented in the carrier plane, as a result of which a mark becomes visible. Such a mark can be erased in that all the particles are re-oriented in the carrier plane by means of a magnetic field which extends in this carrier plane, which re-orientation is similar to the pre-orientation applied before a mark is made on a marking carrier. As will be described hereinafter, a marking device of the apparatus 1 comprises a marking element in the form of a thin rod-shaped permanent magnet, by means of which line-shaped marks can be made on the marking carrier 26 comprising magnetically orientable particles.

Figure 4:
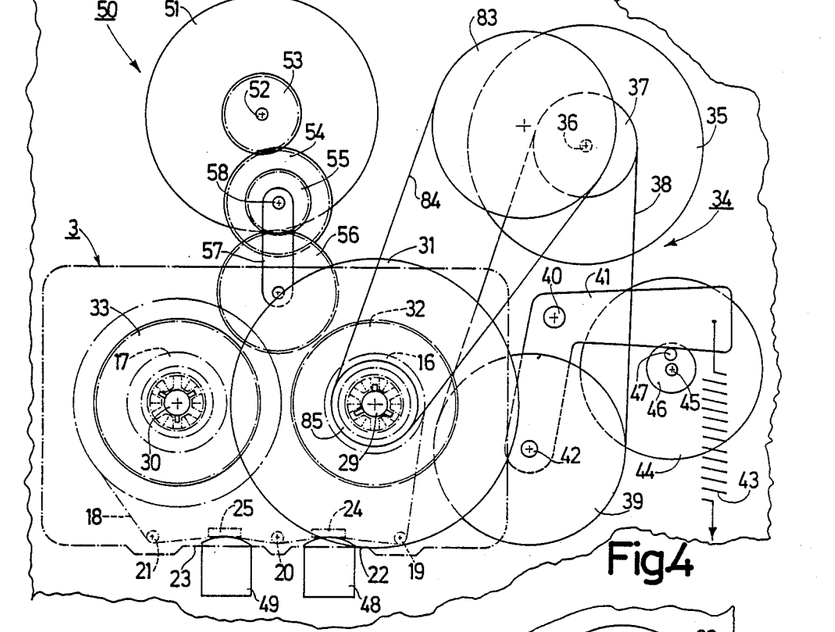
FIG. 4 is an enlarged-scale diagrammatic plan view of the drive means provided in the apparatus shown in FIG. 1 in order to drive the magnetic tape accommodated in the cassette in the "normal forward", "fast forward" and "fast reverse" modes.

FIG. 4 shows diagrammatically the drive means provided in the apparatus 1 to drive the magnetic tape 18, the cassette 3 being represented diagrammatically in dash-dot lines. In the "normal forward" and "fast forward" modes the magnetic tape 18 is driven exclusively by driving the reel hub 16 and in the "fast reverse" modes exclusively by driving the reel hub 17. For driving the reel hubs 16 and 17 the apparatus 1 comprises two rotatably journalled and rotatably drivable winding mandrils 29 and 30 which, when a cassette 3 is loaded into the apparatus 1, enter into driving engagement with the reel hubs 16 and 17 through one of the two main walls of the cassette 3, depending on the position of the cassette. The winding mandril 29 is coaxial with and rotationally locked to a friction wheel 31 and a gear wheel 32 and the winding mandril 30 is coaxial with and rotationally locked to a gear wheel 33, the two gear wheels 32 and 33 being disposed at the same axial level. The friction wheel 31 serves to drive the winding mandril 29 in the "normal forward" mode. The winding mandril 29 can be driven in the "fast forward" mode via the gear wheel 32 and the winding mandril 30 can be driven in the "fast reverse" mode via the gear wheel 33.

A drive means 34 provides the drive of the magnetic tape 18 in the "normal forward" mode. The drive means 34 comprises a drive motor 35, whose motor shaft 36 carries a pulley 37. By means of a belt 38 the pulley 37 can drive a further pulley 39, which is rotatably journalled on an L-shaped actuating lever 41 which is pivotable about a spindle 40. The pulley 39 is rotationally locked to a shaft 42 which can be made to enter into driving engagement with the friction wheel 31, which is coaxial with the winding mandril 29, by an appropriate movement of the actuating lever 41. An actuating spring 43 acts on the actuating lever 41 to bring the shaft 42 in engagement with the friction wheel 31. The movement of the lever 41 is controlled by a motor 44, whose motor shaft 45 carries a wheel 46 provided with an eccentric pin 47, against which pin the actuating lever 41 abuts under the influence of the actuating spring 43 when the wheel 46, which can be driven by the motor 44, is in its rest position shown in FIG. 4. In order to bring the shaft 42 in engagement with the friction wheel 31 the motor 44 rotates the wheel 46 through approximately half a revolution, causing the eccentric pin 47 to become disengaged from the actuating lever 41, which is pivoted clockwise about its spindle 40 under the influence of the actuating spring 43, so that the shaft 42 engages with the friction wheel 31.

In the "normal forward" mode the drive motor 35 drives the pulley 37 in the clockwise direction with a predetermined speed. The pulley 37 then drives the winding mandril 29 and consequently the winding mandril 16 in the anti-clockwise direction via the belt 38, the pulley 39, the shaft 42 and the friction wheel 31, so that the magnetic tape 18 is wound onto the reel hub 16 and is moved past a magnetic recording and reproducing head 48 and a magnetic erase head 49 in the apparatus. During this tape transport in the "normal forward" mode a dictation can be recorded and reproduced, or erased.

The apparatus 1 comprises a further drive means 50 for driving the magnetic tape 18 in the "fast forward" and "fast reverse" modes. The drive means 50 comprises a further drive motor 51, whose motor shaft 52 carries a gear wheel 53. A first intermediate gear wheel 54, which is rotatably journalled in the apparatus 1, is constantly in mesh with the gear wheel 53. A second intermediate gear wheel 55 is coaxial with the first intermediate gear wheel 54 and is rotationally locked thereto. A driven gear wheel 56 is constantly in mesh with the second intermediate gear wheel 55 and is rotatably supported on a pivotable arm 57, whose pivot 58 is coaxial with the two intermediate gear wheels 54 and 55. In the "normal forward" and "stop" modes the gear wheel 56 is held in a rest position shown in FIG. 4 by means of a disengageable latching device, in which position the gear wheel 56 is not in driving engagement with the gear wheels 32 and 33, which are coaxial with the winding mandrils 29 and 30. If either the "fast forward" or the "fast reverse" mode is selected the latching device releases the gear wheel 56 to enable it to be pivoted about the pivot 58 and to mesh with one of the two gear wheels 32 and 33.

In the "fast forward" mode the gear wheel 53 is driven in the clockwise direction by the further drive motor 51, so that the driven gear wheel 56 is also rotated clockwise and, as result of the friction in the gear mechanism, is pivoted in the anti-clockwise direction by the arm 57, causing it to mesh with the gear wheel 32, which is coaxial with the winding mandril 29, and to drive the gear wheel 32 and the winding mandril 29 and the reel hub 16 in the anti-clockwise direction, as a result of which the magnetic tape 18 is wound onto the reel hub 16 in the "fast forward" mode. The constant speed of the further drive motor 51 is selected in such a way that in the "fast forward" mode the magnetic tape 18 is moved approximately twenty times as fast as in the "normal forward" mode. In the "fast reverse" mode the further drive motor 51 drives the gear wheel 53 in the anti-clockwise direction, so that the drive wheel 56 is also rotated anti-clockwise and, as a result of the pivotal movement of the arm 57, enters into driving engagement with the gear wheel 33, which is coaxial with the winding mandril 30, to drive the winding mandril 30 and the reel hub 17 in the clockwise direction, which causes the magnetic tape 18 to be wound onto the reel hub 17 in the "fast reverse" mode. The further drive motor 51 then has the same constant speed as in the "fast forward" mode, so that in the "fast reverse" mode the speed of transport of the magnetic tape is the same as that in the "fast forward" mode.

It is to be noted that immediately after insertion of a cassette 3 into the apparatus 1 the apparatus is set to the "fast reverse" mode in order to wind the magnetic tape 18 wholly onto the reel hub coupled to the winding mandril 30. Subsequently, the "fast reverse" mode is terminated automatically. In this way it is achieved that before every dictation-recording or reproducing operation in the apparatus the magnetic tape 18 is wound wholly onto the reel hub coupled to the winding mandril 30. This is essential for the display and marking device to be described hereinafter, which device enables the length of magnetic tape transported between the reel hub coupled to the winding mandril 30 and the reel hub coupled to the winding mandril 29 to be indicated, the initial value of this indication being zero, which corresponds to the situation in which the whole length of magnetic tape is wound on the reel hub coupled to the winding mandril 30.

The display and marking device 59 of the apparatus 1, hereinafter briefly referred to as marking device, will now be described with reference to FIG. 5. The marking device performs a display function to indicate the instantaneous tape-transport position, as well as a marking function enabling specific passages on the tape to be marked and indicated selectively. The latter function will be described in more detail hereinafter.

The marking device 59 enables one of the two marking carriers 26 arranged on the cassette 3 to be provided selectively with line-shaped marks of different types, which indicate an instantaneous relative position between the magnetic tape 18 and the recording and reproducing head 48. The marking device 59 comprises a marking element 60 constituted by a thin rod-shaped permanent magnet which is magnetised in the axial direction of the rod and whose axis extends substantially perpendicularly to the plane of the marking carrier 26, its free end, which faces the cassette 3, being positioned on the marking carrier 26 in its operating position shown in FIG. 5. The rod-shaped permanent magnet 60 is mounted in a pointer 61 which projects from a block-shaped pointer support 62. The pointer support 62 has a through bore by which it is pivotally mounted on a sleeve 63, which has one end rigidly connected to a block-shaped sleeve support 64 and its other end to an arm 65. The sleeve support 64, the sleeve 63 and the arm 65 are formed with through-bores by means of which these elements are slidably mounted on a guide rod 66. The two ends of the guide rod 66 engage in limbs 67 and 68 respectively of a U-shaped member 69, whose portion 70 interconnects the two limbs 67 and 68. By means of its two limbs 67 and 68 the member 69 is pivotally mounted on a shaft 71, which as shown in FIG. 5 is situated underneath the guide rod 66. The shaft 71 is rotatably supported in two stationary mounts strips 72 and 73. The shaft 71 comprises a lead screw 74, which is in mesh with teeth formed on a projection 75 of the sleeve support 64. In this way the lead screw 74 can drive the sleeve support 64 together with the sleeve 63 via the projection 75 and, consequently, the pointer 61 together with the marking element 60 which are pivotally mounted on said sleeve, the sleeve support 64 together with the sleeve 63 which carries the pointer 61 being guided by the guide rod 66 during driving. Since the guide rod 66 extends parallel to the longitudinal direction of the marking carrier 26 the marking element 60 is guided along a line 26a which extends parallel to the longitudinal direction of the marking carrier 26 and is shown as a dash-dot line in FIG. 5. A helical leg spring 76 is arranged on the sleeve 63 and has one angular free end portion which engages with the projection 75 of the sleeve support 64 and another angular free end portion which engages with the pointer 61, thus ensuring that during normal operation of the marking device 59 the teeth on the projection 75 remain in mesh with the lead screw 74 and the marking element 60 remains positioned on the marking carrier 26. One end of a return spring 77 acts on the arm 65, which is connected to the sleeve 63, and its other end is attached to the limb 67 of the member 69. The pointer 61 with the marking element 60 can be moved along the marking carrier 26 out of the initial position shown in FIG. 5, in which the pointer 61 indicates the value zero on the scale 28, opposed by the force of this return spring 77.

Figure 7:
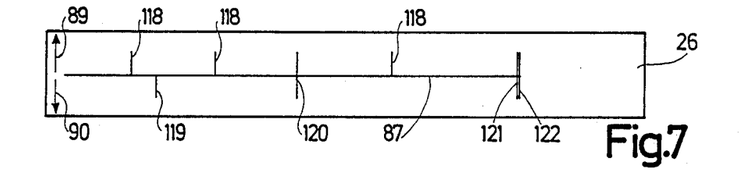
FIG. 7 shows a marking carrier arranged on the cassette shown in FIG. 3 to an enlarged scale in comparison with FIGS. 3 and 5, on which marking carrier marks of all the four different types have been made.

To drive the shaft 71 together with the lead screw 74 a helical gear wheel 78 is rotationally locked to the shaft 71 and is constantly in mesh with a worm wheel 79. The worm wheel 79 is in mesh with a worm 80, which is rotationally locked to a coaxial gear wheel 81. The gear wheel 81 meshes with a further gear wheel 82, which is rotationally locked to a coaxial pulley 83. The pulley 83 is coupled to a further pulley 85 via a belt 84, the latter pulley being coaxial with and rotationally locked to the winding mandril 29, as can be seen in FIG. 4. In the present drive system the transmission ratios are selected in such a way that when the winding mandril 29 is rotated anti-clockwise, as in the "normal forward" and "fast forward" modes, the lead screw 74 moves the pointer 61 together with the marking element 60 in the direction indicated by the arrow 86 opposed by the force of the return spring 77. When the winding mandril 29 rotates in the clockwise direction, as in the "fast reverse" mode, the pointer 61 together with the marking element 60 is driven by the lead screw 74 in a direction opposite to that indicated by the arrow 86. Since the drive of the marking element 60 is derived from the winding mandril 29 which is coupled to the reel hub 16, the marking element 60 is driven in synchronism with the relative movement between the magnetic tape 18 and the magnetic recording and reproducing head 48. When the magnetic tape 18 is driven the marking element 60 is driven in synchronism with the magnetic tape, the marking element sliding on the marking carrier 26 along the line 26a and forming a continuous line 87 on the marking carrier 26 in the longitudinal direction of this carrier, as can be seen in FIG. 7.

Figure 5:
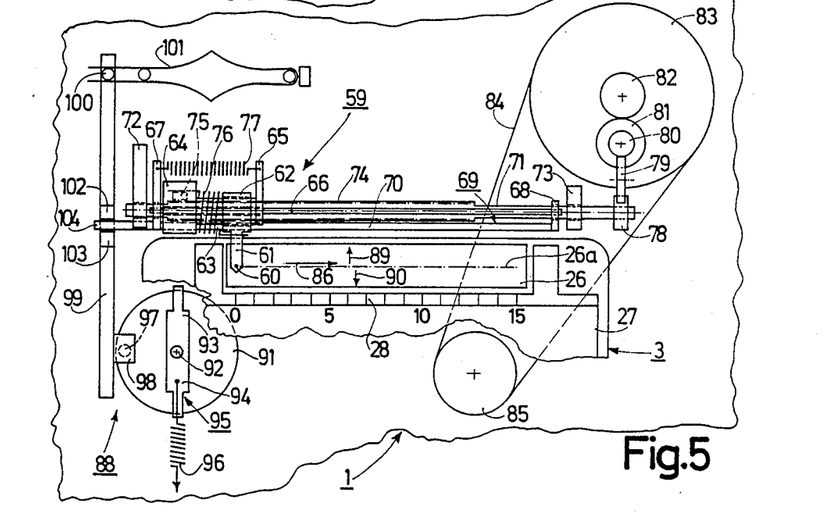
FIG. 5 is an enlarged-scale diagrammatic plan view of a marking device of the apparatus shown in FIG. 1, by means of which marking device the marking element marks of four different types can be made on the marking carriers on the cassette, the marking element being movable for the purpose of marking by means of an actuating device comprising an actuating motor.

To form marks on the marking carrier 26 the marking element 60 can be moved to and fro by means of an actuating device 88 in a direction perpendicular to the line 26a along which the marking element is guided, i.e. in the present case also perpendicular to the continuous line 87, starting from the line 26a in a first direction, indicated by an arrow 89 in FIG. 5, and in a second direction, indicated by an arrow 90 in FIG. 5 and opposite to said first direction. The actuating device 88 comprises an actuating motor 91, whose motor shaft 92 carries a lever 95 having two arms 93 and 94, a return spring 96, which extends substantially in the longitudinal direction of the lever 95, acting on the arm 94. The two free ends of the arms 93 and 94 are adapted to cooperate with a pin 97, which is arranged on a lateral projection 98 of an axially movable slide 99 of the actuating device 88. A pin 100 which projects from the slide 99 keeps the slide in its rest position shown in FIG. 5 by means of a leg spring 101 which is stationarily supported in the apparatus and can be returned into this rest position by the leg spring 101 after the slide 99 has been moved by means of the actuating motor 91. The slide 99 further comprises two projections 102 and 103 between which a pin 104 is disposed transversely of the slide 99 and which projects laterally from and is fixedly connected to the limb 67 of the member 69.

To move the slide 99, in order to form a mark on the marking carrier 26, the actuating motor 91 is briefly connected to a supply voltage V and is briefly driven in either direction of rotation, so that one of the two arms 93 and 94 of the lever 95, which is driven by the actuating motor 91, abuts against the pin 97 and thereby briefly moves the slide 99, after which the supply voltage V is switched off and the lever 95 is returned to its rest position by the return spring 96 and the slide 99 is returned to its rest position by the leg spring 101. When the slide 99 is moved by means of the actuating motor 91 the member 99 is pivoted about the shaft 71 via the pin 104 in such a way that by means of the guide rod 66, the sleeve 63 and the pointer 61 the marking element 60 is moved over a predetermined travel starting from the line 26a, in one of the two opposite directions 89 and 90 against the instantaneous direction of movement of the slide 99. During such a movement the marking element 60 slides over the marking carrier 26, thereby forming on the marking carrier 26 a mark corresponding to the relative position between the magnetic tape 18 and the recording and reproducing head 48 at the instant of actuation. When the slide 99 is returned to its rest position by means of the leg spring 101 the marking element 60 slides over the marking carrier at a location which already exhibits a mark, but in the opposite direction, so that the same mark is applied again. Thus, a double mark is formed at the same location on the marking carrier.

It is to be noted that when the button 4 for opening the cover 2 of the cassette receptacle of the apparatus 1 is pressed a separate actuating device, not shown moves the slide 99 in the direction indicated by the arrow 90 further than the actuating motor 91 and maintains the slide in its displaced position, the pointer 61 and the sleeve 63 together with the sleeve support 74 then being pivoted away from the cassette in the direction indicated by the arrow 89 via the member 69, to such an extent that the pointer 61 is situated outside the path of removal and insertion of the cassette, so that a cassette can be removed and inserted without any obstruction and the teeth on the projection 75 become disengaged from the lead screw 74, thus enabling the return spring 77 to set the pointer 61 to its initial position via the sleeve 63. Since this detail is not relevant to the present invention, it is not shown in FIG. 5 in order to simplify the drawing.

Figure 6:
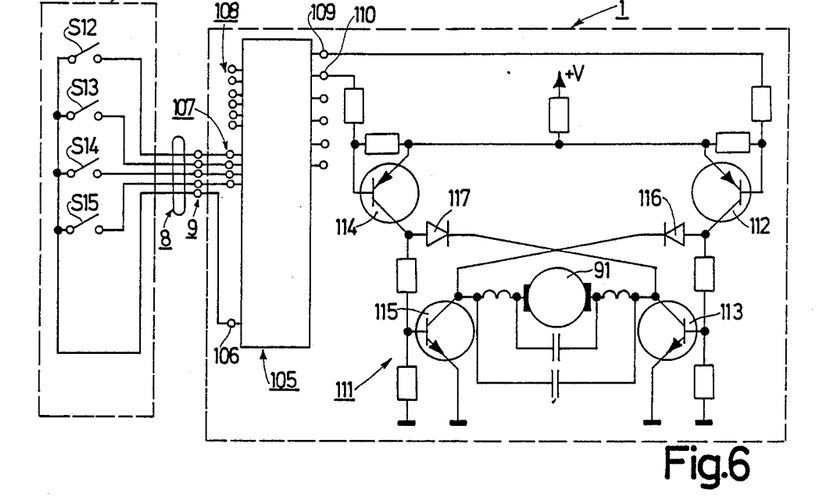
FIG. 6 shows circuit diagrams of the apparatus shown in FIG. 1 and of the microphone shown in FIG. 2, the circuit of the apparatus comprising a microprocessor which inter alia enables a control circuit for the actuating motor of the actuating device for the marking element of the marking device shown in FIG. 5 to be controlled.

FIG. 6 shows a circuit diagram of those parts of the circuit of the apparatus 1 shown in FIG. 1 and the microphone shown in FIG. 2 which are relevant to the present invention, the apparatus 1 and the microphone 7, which can be connected to this apparatus via, the lead 8 and the plug 9, being indicated in broken lines. Switches which can be closed by means of the buttons 12, 13, 14 and 15 of the microphone 7 for the purpose of marking are correspondingly referenced S12, S13, S14 and S15. The apparatus 1 comprises a microprocessor 105, which controls the operating functions and modes of operation of the apparatus. An output 106 of the microprocessor 105 is connected to one of the switch contacts of all the switches S12 to S15 via a line of the lead 8. The microprocessor supplies a cyclic interrogation signal to the switches S12 to S15 via said output 106 which signal, when a switch is closed, is applied to one of a group 107 of microprocessor inputs via a line of the cable 8 connected to the other switch contact of every switch, the microprocessor interpreting the appearance of the interrogation signal on the relevant input as a sign that the switch S12, S13, S14 or S15 connected to said input is closed. Further switching and control signals can be applied to a further group 108 of inputs of the microprocessor 105, for example signals from the keys of the keyboard 5. The microprocessor 105 comprises two outputs 109 and 110, to which a control circuit 111 for the actuating motor 91 of the actuating device 88 for the marking element 60 is connected. By means of this control circuit 111 the actuating motor 91 can be connected to a positive supply voltage V and the direction of rotation of the actuating motor 91 can be reversed. The control circuit basically comprises four transistors 112, 113, 114 and 115 and two diodes 116 and 117. In order to keep the actuating motor 91 disconnected from the supply voltage V, the two outputs 109 and 110 are brought at a high potential H. The two transistors 112 and 114 are then cut off and the actuating motor 91 is inoperative. When a low potential L is applied to an output 109 of the microprocessor 105 the transistors 112 and 113 are turned on and a motor current will flow from the voltage source V via the transistor 112, the diode 116, the actuating motor 91 and the transistor 113, as a result of which the actuating motor 91 drives the lever 95 in the anti-clockwise direction. When the other output 110 of the microprocessor 105 is set to a low potential L the transistors 114 and 115 are turned on and a motor current will flow from the voltage source V via the transistor 114, the diode 117, the actuating motor 91 and the transistor 115, as a result of which the actuating motor 91 drives the lever 95 in the clockwise direction. Moreover, it is to be noted that in addition to the outputs 109 and 110 the microprocessor 105 has further outputs via which the microprocessor can control operating functions and modes of operation of the apparatus. It is to be noted, inter alia in view of the program flow illustrated in FIG. 10, that the microprocessor in the apparatus starts the "normal forward" mode via one of these outputs.

In the present apparatus the marking device 59 enables four different types of marks to be made on a marking carrier 26 in an advantageous manner. These four different types of marks are shown in FIG. 7. In order to apply a mark of a first type the actuating device 98 moves the marking element 60 of the marking device 59 starting from the line 26a to and fro in the first direction 89, the marking element being first moved in the first direction 89 away from the line 26a, or the continuous line 87, starting from the line 26a by briefly energizing the actuating motor 91 and, immediately after this being moved back towards the line 26a or the continuous line 87 by switching off the actuating motor 91, so that the marking element 60 forms a mark of the first type on the marking carrier 26, which mark is formed by a line 118 which extends transversely of the line 87 in the first direction 89. In order to apply a mark of a second type the actuating device 88 moves the marking element 60 to and fro in the second direction 90 starting from the line 26a, the marking element being first moved in the second direction 90 away from the line 26a, or the continuous line 87, starting from said line 26a by briefly energizing the actuating motor 91 and, immediately after this, being moved back towards the line 26a, or the continuous line 87 by switching off the motor 91, so that the marking element 60 forms a mark of the second type on the marking carrier 26, which mark is formed by a line 119 which extends transversely of the line 87 in a second direction 90. These two types of marks are already known.

In order to apply a new mark of a third type the actuating device 88 similarly moves the marking element 60 to and fro in both directions 89 and 90 immediately after each other, i.e. in the present case first from the line 26a in the first direction 89 away from the line 26a or the continuous line 87, immediately after this back towards the line 26a or the line 87, then immediately in the second direction 90 away from the line 26a or the continuous line 87, and immediately after this back to the line 26a or the continuous line 87, the marking element 60 thus forming a new mark of the third type on the marking carrier 26 in the form of a stroke 120 which extends transversely of the continuous line 87 both in the first direction 89 and in the second direction 90. In order to apply a further new mark of a fourth type the actuating device 88 consecutively moves the marking element 60 to and fro in both directions 89 and 90 immediately after each other, which is effected two times at a predetermined time interval, namely in the present case every time starting from the line 26a first in the first direction 89 away from the line 26a or the continuous line 87, then immediately back to the line 26a or the line 87, immediately after this in the second direction 90 away from the line 26a or the continuous line 87, and then immediately back to the line 26a or the line 87, the marking element 60 forming a new mark of the fourth type on the marking carrier 26, which mark takes the form of two adjacent strokes 121 and 122 which extend transversely of the continuous line 87 both in the first direction 89 and in the second direction 90 and which are spaced from each other by a distance corresponding to said predetermined time interval.

Thus, by means of the marking device, which is provided anyway in the present apparatus, two additional new types of marks can be formed on the marking carrier, which marks are obtained by moving the marking element in two directions by means of the actuating device which is constructed and controlled accordingly for this purpose. By forming the marks as strokes which extend transversely of the continuous line in both directions these new marks can be identified easily and unambiguously and can readily be distinguished from the known marks.

The marks of the types defined in the foregoing are made on the marking carrier by a dictator in order to characterize dictations or dictated passages. Marks of the first type identify the end of a dictation on the magnetic tape for which no special instructions, wishes or requirements with respect to it transcription have been given. Such a mark of the first type is made on the marking carrier if the end of a dictation made on the magnetic tape is situated opposite the magnetic recording and reproducing head. Marks of the second type characterize a passage of a dictation on the magnetic tape for which the dictator has given special instructions, such as a dictation insert, a correction to the dictation, or another wish relating or not relating to the dictation, which may also be recorded on the magnetic tape or on a separate storage means, such as a further magnetic tape or a note. Marks of the third type always characterize the end of a dictation on the magnetic tape requiring special attention or priority during transcription; such dictations are referred to as priority dictations. Marks of the fourth type always characterized the end of a group of dictations on the tape which belong together and which may, for example stem from a single person or relate to the same subject matter. Such a group of related dictations may also comprise dictations which have been transmitted over the telephone network to a dictation machine which can be connected to the telephone network, which dictation machine automatically makes a mark of the fourth type when the transmission of these dictations ceases and the call ends.

The marks of the four types described in the foregoing made on the marking carrier shown in FIG. 7 can provide the following information about the dictations recorded in the track of a magnetic tape associated with this marking carrier. The magnetic tape contains a group of dictations made up of five related dictations, the end of the group being indicated by the mark of the fourth type by the two strokes 121 and 122. The third dictation is a priority dictation, whose end is indicated by the mark of the third type formed by the stroke 120. The dictator has given a special instruction for a passage of the second dictation; this passage is characterized by a mark of the second type formed by the stroke 119. The first, the fourth and the fifth dictation are dictations for which the dictator has given no additional instructions, the ends of the first and the fourth dictation each being indicated by a mark of the first type formed by a stroke 118. A mark of the first type at the end of the fifth dictation has not been given because this location is already indicated by the mark of the fourth type formed by the two strokes 121 and 122.

The program sequence performed by the microprocessor 105 of the circuit shown in FIG. 6 in order to form marks of the four above types on the marking carrier 26 will now be described with reference to the flow charts of FIGS. 8 to 10.

Figure 8:
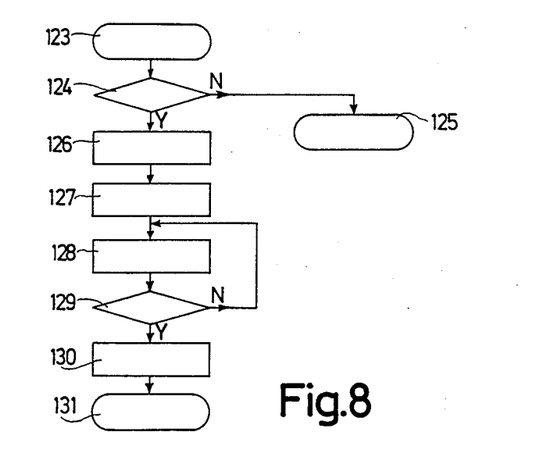
FIG. 8 is a flow chart of a program which is performed in the microprocessor of the circuit shown in FIG. 6 in order to apply a mark of a first type.

The microprocessor 105 performs the program sequence corresponding to the flow chart shown in FIG. 8 in order to form a mark 118 of a first type on the marking carrier 26. This program sequence is started in block 123. In the next block 124 it is ascertained whether the switch S12 is closed. If this is not the case, another program sequence is selected in block 125. However, said switch is closed, the output 109 of the microprocessor 105 is set to a low potential L in block 126. As a result of this, the actuating motor 91 is started to pivot the lever 95 in the anti-clockwise direction. Subsequently, in block 127, the count of a counter $Z_n$ is set to zero. Then the count of the counter $Z_n$ is incremented in block 128. After this it is checked in block 129 whether the count of the counter $Z_n$ has reached the value N. The value N is selected to correspond to the period of time for which the actuating motor 91 of the actuating device 88 is energised. In practice, this value N is selected in such a way that the motor remains energised for several milliseconds, for example 50 milliseconds. As long as the count of the counter $Z_n$ has not reached the value N the program each time continues in block 128. As soon as the count of the counter $Z_n$ has reached the value N, the program sequence is continued in block 130. In block 130 the output 109 of the microprocessor 105 is again set to a high potential H, causing the motor 91 to be switched off, as a result of which the lever 95 is reset by the return spring 96 and the slide 99 is reset by the leg spring 101. Subsequently, in block 131, the current program sequence is discontinued to proceed with another program.

When this program is performed the actuating motor 91 is energised for a period of time corresponding to the value N, in such a way that the arm 93 of the lever 95 of the actuating device 88 abuts against the pin 97 on the slide 99 and positions the slide 99 in such a way that starting from the continuous line 87 the marking element 60 is moved in the direction indicated by the arrow 89 away from said line 87. Immediately after this the actuating motor 91 is switched off and the lever 95 is returned to its rest position by the return spring 96 and the slide 99 is reset to its rest position by the leg spring 101, so that the marking element 60 is returned to the continuous line 87. During this cycle of movements of the marking element 60 this element forms a mark of the first type on the marking carrier 26, which mark is formed by a stroke 118 which extends transversely of the line 87 in the direction indicated by the arrow 89.

In order to apply a mark 119 of the second type a program corresponding to that shown in FIG. 8 is performed. However, in the corresponding block 124 it is now ascertained whether the switch S13 is closed, in the corresponding block 126 the output 110 of the microprocessor is set to a low potential L, and in the corresponding block 130 the output 110 of the microprocessor is again brought at a high potential H. As a result of this, the actuating motor 91 is energised for a period of time corresponding to the value N to pivot the lever 95 clockwise until its arm 94 abuts against the pin 97 on the slide 99, causing the slide 99 to be moved accordingly, so that starting from the line 87 the marking element 60 is moved in the direction indicated by the arrow 90 away from this line 87. Immediately after this the actuating motor 91 is switched off and the slide 99 is reset by the leg spring 101, so that the marking element 60 is returned to the line 87. During this cycle of movements of the marking element 60 this element forms a mark of the second type on the marking carrier 26, which mark is formed by a stroke 119 which extends transversely of the line 87 in the direction indicated by the arrow 90.

Figure 9:
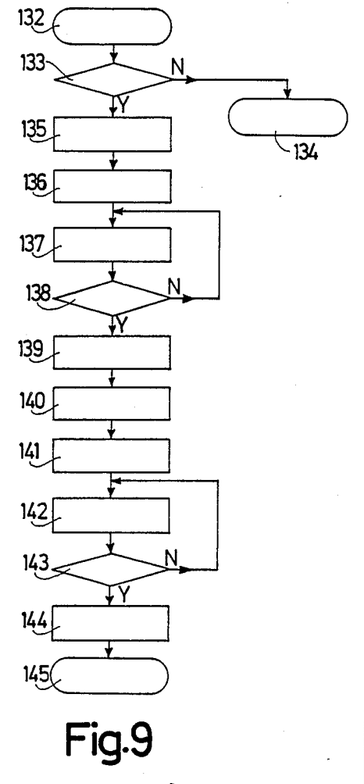
FIG. 9 is a flow chart of another program which is performed by the microprocessor of the circuit shown in FIG. 6 in order to apply a mark of a third type.

In order to apply a mark 120 of the third type the microprocessor 105 performs the program illustrated by the flow chart in FIG. 9. This program is started in block 132. In block 133 it is checked whether the switch S14 is closed. If this is not the case, another program is selected in block 134. However, if said switch is closed the output 109 of the microprocessor 105 is set to a low potential L in block 135. As a result of this, the actuating motor 91 is started, causing the lever 95 to be pivoted in the anti-clockwise direction. Subsequently, in block 136 the count of the counter $Z_n$ is set to zero. After this the count of the counter $Z_n$ is incremented in block 137. Then it is ascertained in block 138 whether the count of the counter $Z_n$ has reached the value N. As long as the count of the counter $Z_n$ has not yet reached the value N the program sequence continues each time in block 137. Once the count of the counter $Z_n$ has reached the value N the program is continued in block 139. In block 139 the output 109 of the microprocessor is again set to a high potential H, so that the actuating motor 91 is switched off, causing the lever 95 to be reset by the return spring 96 and the side 99 to be reset by the leg spring 101. Directly after this, in block 140, the output 110 of the microprocessor 105 is set to a low potential L, causing the actuating motor 91 to be started to pivot the lever 95 clockwise. After this, in block 141, the count of the counter $Z_n$ is reset to zero. Subsequently, in block 142, the count of the counter $Z_n$ is incremented. In block 143 it is now ascertained whether the count of the counter $Z_n$ has reached the value N. If this is not the case, the program again proceeds with block 142. If said count is reached, the program proceeds with block 144. In block 144 the output 110 of the microprocessor 105 is set to a high potential H, so that the lever 95 and the slide 99 are reset. Subsequently, in block 145, the program sequence is discontinued or another program sequence is selected.

During the program sequence described above the marking element 60 is first moved from the line 87 in the direction indicated by the arrow 89 away from this line 87 and, immediately after this, back to this line 87, after which it is directly moved in the direction indicated by the arrow 90 away from the line 87 and then immediately back to the line 87, the marking element forming a mark of the third type on the marking carrier 26, which mark has the form of a stroke 120 which extends transversely of the line 87 both in the direction indicated by the arrow 89 and by the arrow 90, as can be seen in FIG. 7.

Figure 10:
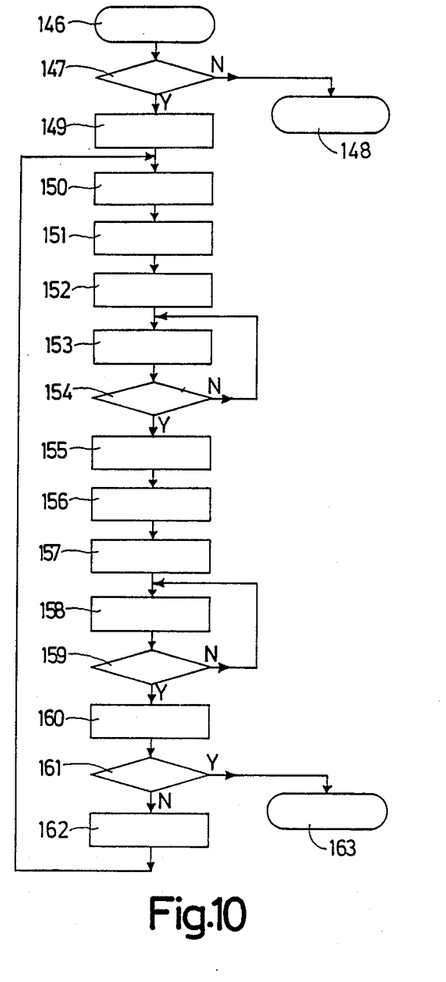
FIG. 10 is a flow chart of a further program which is performed in the microprocessor of the circuit shown in FIG. 6 in order to apply a mark of a fourth type.

In order to apply a mark of the fourth type the microprocessor 105 performs the program sequence corresponding to the flow chart in FIG. 10. This program is started in block 146. In the next block 147 it is ascertained whether the switch S15 is closed. If this is not the case, another program is selected in block 148. If said switch is closed, the count of a further counter $Z_k$ is set to zero in block 149. Subsequently, in block 150, the count of the further counter $Z_k$ is incremented. After this, in block 151, the output 109 of the microprocessor 105 is set to a low potential L, so that the actuating motor 91 pivots the lever 95 in the anti-clockwise direction. In block 152 the count of the counter $Z_n$ is now set to zero. After this the count of the counter $Z_n$ is then incremented in block 153. Subsequently, in block 154, it is ascertained whether the count of the counter $Z_n$ has reached the value N. If this is not the case, the program again proceeds with block 153. If said count is reached, the output 109 of the microprocessor 105 is set to a high potential H in block 155, so that the actuating motor 91 is switched off again and the lever 95 is reset to its rest position by the return spring 96. Immediately after this, in block 156, the output 110 of the microprocessor 105 is set to a low potential L, so that the actuating motor 91 pivots the lever 95 in the clockwise direction. Subsequently, in block 157, the count of the counter $Z_n$ is set to zero. After this, in block 158, the count of the counter $Z_n$ is incremented. In block 159 it is then ascertained whether the count of the counter $Z_n$ has reached the value N. If this is not the case, the program again proceeds with block 158. However, if said count is reached, the output 110 of the microprocessor 105 is set to a high potential H, so that the actuating motor 91 is switched off and the lever 95 is returned to its rest position by the return spring 96. In the next block 161 it is checked whether the count of the further counter $Z_k$ has reached the value two. If this is not the case the microprocessor switches on the "normal forward" mode in block 162 via its relevant further outputs for a given period of time, which in practice is found to be suitably eight seconds, causing the pointer 61 of the marking device 59 to be moved in the direction indicated by the arrow 86 over a distance corresponding to said given period, so that the continuous line 87 on the marking carrier 26 is prolonged. After block 162 the program again proceeds with block 150, so that after this the program sequence from block 150 to block 161 is repeated. Since during repeating the count of the further counter $Z_k$ is incremented again in block 50, the count of the further counter $Z_k$ will be two when block 161 is reached, so that after block 161, in which it is ascertained that the count of the further counter $Z_k$ has reached the value two, the program proceeds with block 163, in which another program sequence is selected.

By means of the program given in FIG. 10 the marking element 60 forms a mark of the fourth type on the marking carrier 26, which mark comprises two adjacent strokes 121 and 122 which extend from the continuous line 87 both in the first direction 89 and in the second direction 90, as can be seen in FIG. 7.

The scope of the invention is not limited to the embodiment described in the foregoing. For example, in the apparatus in accordance with this embodiment further types of marks can be made on the marking carrier, for example marks which each comprise three adjacent strokes which extend transversely of the continuous line both in the first direction and in the second direction. Moreover, the apparatus itself may be provided with keys for starting the process of forming marks on the marking carrier. In the case of a central dictation system which can be connected to the telephone network, the marking can also be effected by remote control via the telephone network, for example by selecting predetermined digits or digit combinations, which are processed in a microprocessor of the central dictation system. A marking device may be constructed in such a way that the marking element is not guided along a straight line but, for example, along an arcuate line, in which case the marking carrier should also have an arcuate form. In addition, a marking device may comprise two marking elements, one for each direction of movement. A marking carrier need not be attached to a cassette but alternatively it may be adapted to be inserted into a holder for such a marking carrier on the apparatus.

Moreover, a different marking carrier may be used, for example a paper strip on which line-shaped marks can be recorded by means of a marking element resembling a pen. The actuation of the marking element in order to apply marks need not be effected by means of a motor but it may also be effected by means of manually actuated keys arranged on the apparatus, which is of particular advantage in the case of pocket-dictation machines. The embodiment of the apparatus described above is a recording and reproducing apparatus for a record carrier in the form of a tape accommodated in a cassette. However, the invention may also be applied to other recording apparatuses, for example apparatuses in which cassettes containing a plurality of record carriers in the form of magnetic tapes can be inserted each of which can be brought into a recording position in the apparatus, or in apparatuses for disc-shaped record carriers.

We claim:

1. A recording apparatus for a drivable record carrier which is adapted to cooperate with at least one scanning element of the apparatus and which can be moved past the scanning element, which apparatus comprises a marking device for selectively forming line-shaped marks of different types on a marking carrier, which marks indicate an instantaneous relative position between the record carrier and the scanning element which marking device comprises at least one marking element which can be driven in synchronism with the relative movement between the record carrier and the scanning element, which is guided along a line to form line-shaped marks, and which can be moved to and from by means of an actuating device perpendicularly from the line in a first direction perpendicular to said line and in a second direction opposite to said first direction, the actuating device moving the marking element in the first direction to make a mark of a first type and in the second direction to make a mark of a second type, the marks of the first type and the second type being formed by strokes which extend transversely of the line in one of the two directions, characterized in that for making a mark of at least one further type the actuating device in direct succession moves the marking element at least one time in both directions directly after each other, at least one stroke which extends transversely of the continuous line in both directions being formed as a mark of a further type.

2. An apparatus as claimed in claim 1, characterized in that for making a mark of a further type the actuating device moves the marking element in both directions at least twice in succession at a predetermined time interval, at least two adjacent strokes which extend transversely of the continuous line in both directions being formed as a mark of such a further type.

* * * * *